(12) United States Patent
Bates

(10) Patent No.: US 7,760,707 B1
(45) Date of Patent: Jul. 20, 2010

(54) VOICE OVER INTERNET PROTOCOL APPLICATION DEVELOPMENT FRAMEWORK

(75) Inventor: Peter Bates, Morristown, NJ (US)

(73) Assignee: AOL Inc., Dulles, VA (US)

( * ) Notice: Subject to any disclaimer, the term of this patent is extended or adjusted under 35 U.S.C. 154(b) by 1490 days.

(21) Appl. No.: 11/020,679

(22) Filed: Dec. 27, 2004

Related U.S. Application Data

(60) Provisional application No. 60/577,216, filed on Jun. 7, 2004.

(51) Int. Cl.
*H04L 12/66* (2006.01)
*H04M 7/00* (2006.01)

(52) U.S. Cl. .................. 370/352; 379/229

(58) Field of Classification Search ........... 379/93.21, 379/158, 202.01, 205.01, 142.08, 215.01
See application file for complete search history.

(56) References Cited

U.S. PATENT DOCUMENTS

| | | | |
|---|---|---|---|
| 5,200,995 A | 4/1993 | Gaukel et al. | |
| 5,887,056 A | 3/1999 | Sonnenberg | |
| 6,052,372 A | 4/2000 | Gittins et al. | |
| 6,229,879 B1 * | 5/2001 | Walker et al. ............ | 379/88.01 |
| 6,330,317 B1 | 12/2001 | Garfinkel | |
| 6,343,121 B1 | 1/2002 | Infosino | |
| 6,353,663 B1 | 3/2002 | Stevens et al. | |
| 6,477,374 B1 | 11/2002 | Shaffer et al. | |
| 6,483,910 B1 | 11/2002 | Council | |
| 6,498,841 B2 | 12/2002 | Bull et al. | |
| 6,606,647 B2 | 8/2003 | Shah et al. | |
| 6,614,781 B1 | 9/2003 | Elliott et al. | |
| 6,639,977 B1 | 10/2003 | Swope et al. | |
| 6,650,742 B1 | 11/2003 | Elliott | |
| 6,697,474 B1 | 2/2004 | Hanson et al. | |
| 6,735,295 B1 | 5/2004 | Brennan et al. | |
| 6,747,970 B1 | 6/2004 | Lamb et al. | |
| 6,748,072 B1 | 6/2004 | McGraw et al. | |
| 6,757,362 B1 | 6/2004 | Cooper et al. | |
| 6,757,371 B2 | 6/2004 | Kim et al. | |
| 6,798,755 B2 | 9/2004 | Lillie et al. | |
| 6,834,103 B1 * | 12/2004 | Silver et al. ............ | 379/215.01 |

(Continued)

OTHER PUBLICATIONS

USPTO Non-final Office Action, U.S. Appl. No. 11/020,681, mailed Jan. 26, 2009, 16 pages.

(Continued)

*Primary Examiner*—Fan Tsang
*Assistant Examiner*—Solomon Bezuayehu
(74) *Attorney, Agent, or Firm*—Fish & Richardson P.C.

(57) ABSTRACT

Applying services to calls involving subscribers to a telephony services provider includes receiving an indication of a call placed to or from a first call participant. The indication is received by a telephony services provider over a first signaling path of the call that is established between the telephony services provider and a first telephony proxy server that is controlled by a telephony infrastructure provider. Control signals configured to affect a voice path of the call that is established between the first telephony proxy server and a second telephony proxy server also controlled by the telephony infrastructure provider but associated with a second call participant are identified. The identified control signals are sent to the first telephony proxy server over the first signaling path and to the second telephony proxy server over a second signaling path that is established between the telephony services provider and the second telephony proxy server.

38 Claims, 7 Drawing Sheets

U.S. PATENT DOCUMENTS

| | | | |
|---|---|---|---|
| 6,876,734 B1 * | 4/2005 | Summers et al. | 379/202.01 |
| 6,888,935 B1 * | 5/2005 | Day | 379/202.01 |
| 6,912,276 B1 * | 6/2005 | Olafsson et al. | 379/93.35 |
| 6,990,187 B2 * | 1/2006 | MacNamara et al. | 379/210.02 |
| 7,023,980 B2 | 4/2006 | Lenard | |
| 7,130,405 B2 * | 10/2006 | Brown et al. | 379/210.02 |
| 7,180,912 B1 * | 2/2007 | Samarasinghe | 370/474 |
| 7,197,560 B2 * | 3/2007 | Caslin et al. | 709/224 |
| 7,277,528 B2 | 10/2007 | Rao et al. | |
| 7,305,081 B1 | 12/2007 | Kalmanek et al. | |
| 7,342,920 B2 | 3/2008 | Ying et al. | |
| 7,408,925 B1 * | 8/2008 | Boyle et al. | 370/352 |
| 7,418,091 B1 * | 8/2008 | Sylvain | 379/215.01 |
| 2001/0043691 A1 | 11/2001 | Bull | |
| 2002/0118807 A1 | 8/2002 | Pedersen | |
| 2003/0007621 A1 | 1/2003 | Graves et al. | |
| 2003/0076941 A1 | 4/2003 | Tiliks et al. | |
| 2003/0078081 A1 | 4/2003 | Schiemer | |
| 2003/0091032 A1 | 5/2003 | Laxman et al. | |
| 2003/0112944 A1 | 6/2003 | Brown et al. | |
| 2003/0115070 A1 | 6/2003 | Brown et al. | |
| 2003/0156695 A1 | 8/2003 | Brown et al. | |
| 2003/0156700 A1 | 8/2003 | Brown et al. | |
| 2003/0161456 A1 | 8/2003 | Brown et al. | |
| 2003/0215078 A1 * | 11/2003 | Brahm et al. | 379/211.02 |
| 2004/0028208 A1 | 2/2004 | Carnazza et al. | |
| 2004/0114747 A1 | 6/2004 | Trandal et al. | |
| 2004/0133683 A1 | 7/2004 | Keller et al. | |
| 2004/0161080 A1 | 8/2004 | Digate et al. | |
| 2004/0161090 A1 | 8/2004 | Digate et al. | |
| 2004/0208308 A1 | 10/2004 | McGraw et al. | |
| 2004/0213396 A1 | 10/2004 | MacNamara et al. | |
| 2004/0225650 A1 | 11/2004 | Cooper et al. | |
| 2004/0246331 A1 | 12/2004 | Caspi et al. | |
| 2005/0010573 A1 | 1/2005 | Garg | |
| 2005/0100008 A1 | 5/2005 | Miyata et al. | |
| 2005/0147224 A1 | 7/2005 | Olafsson et al. | |
| 2006/0291641 A1 | 12/2006 | Barclay et al. | |
| 2007/0127707 A1 * | 6/2007 | Koser et al. | 379/373.03 |

OTHER PUBLICATIONS

USPTO Non-final Office Action, U.S. Appl. No. 11/020,680, mailed Feb. 6, 2009, 17 pages.

USPTO Non-final Office Action, U.S. Appl. No. 11/146,284, mailed Jun. 26, 2009, 7 pages.

USPTO Final Office Action, U.S. Appl. No. 11/020,681, mailed Jul. 27, 2009, 26 pages.

* cited by examiner

US 7,760,707 B1

VOICE OVER INTERNET PROTOCOL APPLICATION DEVELOPMENT FRAMEWORK

CROSS REFERENCE TO RELATED APPLICATIONS

This application claims the benefit of U.S. Provisional Application No. 60/577,216, filed Jun. 7, 2004, and titled "Voice over Internet Protocol Application Development Framework," the entire contents of which are incorporated by reference in its entirety.

TECHNICAL FIELD

This document relates to systems that provide telephone services using Voice over Internet Protocol (VoIP).

BACKGROUND

In a typical VoIP communications system, a network services provider (i.e., the owner and manager of a network/telephony infrastructure) and a telephone services provider (i.e., a customer-facing provider of telephony services) work together to offer VoIP services to customers over a data network. The network services provider controls the physical media through which the VoIP data travels (e.g., the fiber-optic network and the optical networking equipment) and the proxy servers and voice gateway routers that direct and control the flow of VoIP data. The underlying system is generally capable of creating a basic communications session, with assistance of the telephone services provider in the form of subscriber identifying information (e.g., a telephone number). The telephone services provider typically develops the voice applications that enable the proxy servers and voice gateway routers to handle VoIP calls in accordance with the VoIP telephone services offered by the telephone services provider. The telephone services provider also controls back-end computer systems that may be accessed by the proxy servers or voice gateway routers in response to procedure calls generated while executing a voice application. The back-end computer systems typically store customer-specific, voice-services-related configuration data.

The proxy servers and the voice gateway routers manage the voice paths of VoIP calls and the signaling used to setup and tear down the VoIP calls in accordance with the voice applications developed by the telephone services provider. The voice applications are typically scripts containing Application Programming Interface (API) commands that, when executed by a voice gateway router, manage a VoIP call in accordance with a VoIP service offered to a customer. More particularly, call signals arrive at the voice gateway router, and the voice gateway router processes the signals in a predefined manner that is indicated by the API-based voice applications. At well defined points in the processing of the messaging, the voice gateway router may use API commands to retrieve particular pieces information required by the voice applications. The API commands facilitate development of voice applications and, hence, VoIP services by providing building blocks that may be put together to construct voice applications that offer typical voice services.

SUMMARY

In one general aspect, applying services to calls placed to or from subscribers to a telephony services provider includes receiving an indication of a call placed to or from a first call participant. The indication is received by a telephony services provider over a first signaling path of the call that is established between the telephony services provider and a first telephony proxy server that is controlled by a telephony infrastructure provider. One or more control signals configured to affect a voice path of the call that is established between the first telephony proxy server and a second telephony proxy server also controlled by the telephony infrastructure provider but associated with a second call participant are identified. The identified control signals are sent to the first telephony proxy server over the first signaling path and to the second telephony proxy server over a second signaling path that is established between the telephony services provider and the second telephony proxy server.

Implementations may include one or more of the following features. For example, identifying the control signals may include accessing an indication of whether the first call participant may participate in the call based upon information stored on a back-end system controlled by the telephony services provider related to the first call participant to or from whom the call is placed. A determination may be made as to whether the first call participant is available to participate in the call based upon the accessed indication, and the control signals may be identified based upon the determination of whether the first call participant may participate in the call.

Identifying the control signals may include accessing information to be presented to the first call participant during the call based upon information stored on a back-end system controlled by the telephony services provider related to the first call participant to or from whom the call is placed. Control signals configured to present the accessed information to the first call participant may be identified.

Identifying the control signals may include accessing an indication of availability of the first call participant to place and receive calls based upon information stored on a back-end system controlled by the telephony services provider related to the first call participant to or from whom the call is placed. The control signals may be identified based upon the accessed indication of availability.

Identifying the control signals may include accessing an indication of an activity undertaken by the first call participant at a time at which the indication of the call is received by the telephony services provider based upon information stored on a back-end system controlled by the telephony services provider related to the first call participant to or from whom the call is placed. The control signals may be identified based upon the accessed indication of the activity.

Identifying the control signals may include determining whether the activity is an activity during which the first call participant may or may not participate in the call. The control signals may be identified based upon the determination of whether the first call participant may or may not participate in the call. Accessing an indication of an activity may include accessing an indication of at least one activity from among a list of activities including participation in an event from an electronic calendar of the first call participant, participation in another call, communication with another entity, sending and receiving instant messages, and sending and receiving e-mail messages.

Identifying the control signals may include accessing at least one indication of a time at which a call to the first call participant is to be blocked or allowed based upon information stored on a back-end system controlled by the telephony services provider related to the first call participant to or from whom the call is placed. A present time may be compared to the time at which a call to the first call participant is to be blocked or allowed, and the control signals may be identified based upon the comparison.

Identifying the control signals may include accessing an indication of an amount of time for which the first call participant has participated in phone calls and a maximum allowable amount of time for which the first call participant may participate in telephone calls based upon information stored on a back-end system controlled by the telephony services provider related to the first call participant to or from whom the call is placed. The amount of time for which the first call participant has participated in phone calls may be compared to the maximum allowable amount of time, and the control signals may be identified based upon the comparison.

Identifying the control signals may include accessing an indication of a parental control that has been specified for the first call participant based upon information stored on a back-end system controlled by the telephony services provider related to the first call participant to or from whom the call is placed. The control signals may be identified based upon the accessed indication of the parental control.

Identifying the control signals may include accessing at least one indication of a person to or from whom calls are allowed or blocked based upon information stored on a back-end system controlled by the telephony services provider related to the first call participant to or from whom the call is placed. The second call participant may be compared to the person to or from whom calls are allowed or blocked, and the control signals may be identified based upon the determination of whether the first call participant may participate in the call.

Identifying the control signals may include enabling the first call participant or a guardian or supervisor of the first call participant to specify information stored on a back-end system controlled by the telephony services provider related to the first call participant to or from whom the call is placed that is accessed for use in identifying the control signals. The control signals may be identified based upon the specified information. Enabling the first call participant or a guardian or supervisor of the first call participant to specify the information may include presenting to the first call participant or to guardian or supervisor of the first call participant a graphical user interface with which the first call participant or the guardian or supervisor of the first call participant may specify the information. Identifying the control signals may include accessing at least one call handling preference that has been specified by the first call participant prior to a time at which the indication of the call is received by the telephony services provider based upon information stored on a back-end system controlled by the telephony services provider related to the first call participant to or from whom the call is placed. The control signals may be identified based upon the accessed call handling preference.

Identifying the control signals may include may include accessing at least one call handling preference that has been specified by a supervisor or a guardian of the first call participant prior to a time at which the indication of the call is received by the telephony services provider based upon information stored on a back-end system controlled by the telephony services provider related to the first call participant to or from whom the call is placed. The control signals may be identified based upon the accessed call handling preference.

Identifying the control signals may include updating information stored on a back-end system controlled by the telephony services provider that is accessed when identifying the control signals based upon the identified control signals. The updated information may indicate a status of the first call participant as a result of processing of the identified control signals. Control signals for future calls may be identified based upon the updated information. Updating the information based upon the identified control signals may include updating the information to include at least one indication from a list of indications including an indication of availability of the first call participant to place and receive a call, an indication of an activity undertaken by the first call participant, an indication of a time at which the first call participant may or may not place or receive a call, an indication of a person with which the first call participant may or may not participate in a call, an indication of an amount of time for which the first call participant has participated in calls, an indication of a call handling preference, or an indication of a parental control.

Identifying the control signals may include identifying control signals to cause identification of the first or second call participant who placed the call to be presented to a call recipient before the voice path is established therebetween. Identifying the control signals may include identifying control signals to cause an incoming call notification to be delivered to an intended recipient when the intended recipient is occupied with an ongoing but different call and to enable the intended recipient to interrupt the ongoing but different call to handle the incoming call. Identifying control signals to cause an incoming call notification to be delivered to an intended recipient may include identifying control signals to cause the incoming call notification that identifies the first or second call participant who placed the call to the intended recipient to be delivered to the intended recipient.

Identifying the control signals may include identifying control signals to cause the call to be delivered to an intended recipient, identifying control signals to cause the call to ring busy for the first or second call participant who placed the call, or identifying control signals to cause the call to be forwarded to a system different than a system to which the call was to be routed originally, such as a voicemail system. Identifying the control signals may include identifying control signals to cause the call to be blocked such that an intended recipient of the call does not receive the call, identifying control signals to cause an alert of the call to be presented to the first call participant, or identifying control signals to cause a pre-recorded message to be played to the first or second call participant who placed the call or an intended call recipient.

The voice path may be established between the first telephony proxy server and a second telephony proxy server based on the control signals.

The identified signals may conform to the Session Initiation Protocol (SIP).

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

An enhanced VoIP communications system enables a telephone services provider to directly generate and process the signaling information (e.g., SIP commands/information) used to setup and tear down VoIP calls. The enhanced VoIP communications system provides greater flexibility by allowing the telephone services provider to rapidly develop voice applications that include features not available through use of existing APIs, and to redefine the format of the voice application procedure calls to back-end systems. Moreover, the enhanced VoIP communications system enables development of voice applications that include references to back-end systems prior to a determination of the type of voice service associated with the call. The call management and signal processing may then be entirely determined by the customer-specific and other contextual data stored in the back-end systems.

The enhanced VoIP communications system is advantageous over a typical VoIP communications system in which APIs are used to develop voice services to be applied to telephone calls. Since the enhanced VoIP communications system does not use APIs to develop the voice services, a telephone services provider is not limited to providing services that may be developed using the predefined set of APIs and corresponding procedure calls. Therefore, development of voice applications is not limited by API development, which would be required for applications that include features that are not covered by the existing set of APIs. Developing new APIs may slow down the application development process significantly. The kinds of call treatments that can be applied to a particular session in the enhanced VoIP communications system is not limited by the APIs. More particularly, alternative call treatments are not limited to those stored away from the telephone service provider. The telephone service provider may apply concurrent, asynchronous activity taking place in the telephone service provider's environment to affect the session in progress, without explicitly anticipating the asynchronous activity in the application.

Figure 1:
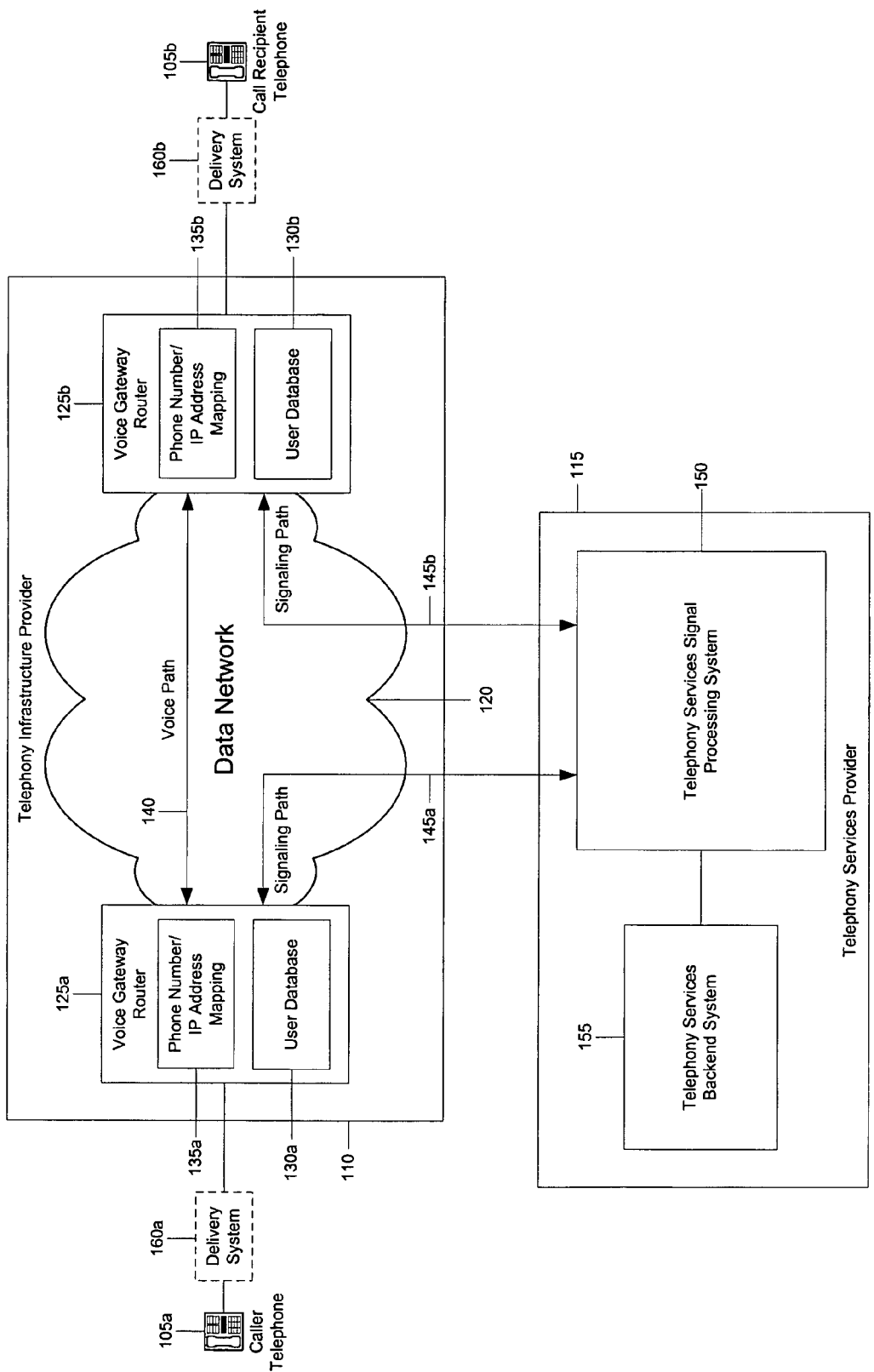
FIG. 1 is a block diagram of a communications system for providing telephone services.

Referring to FIG. 1, an enhanced communications system 100 provides VoIP telephone services through use of voice applications that directly process signaling information used to establish VoIP calls. The communications system 100 controls calls placed between a caller telephone 105a and a call recipient telephone 105b. The call is serviced by a telephony infrastructure provider 110 that receives instructions for handling the call from a telephony services provider 115. The telephony infrastructure provider 110 includes a data network 120 and voice gateway routers 125a and 125b. The voice gateway routers 125a and 125b include respective user databases 130a and 130b and respective mappings 135a and 135b. The voice gateway routers 125a and 125b establish a voice path 140 between themselves and respective signaling paths 145a and 145b between each of them and the telephony services provider 115. The telephony services provider 115 includes a telephony services signal processing system 150 and a telephony services back-end system 155. The telephones 105a and 105b communicate with the telephony infrastructure provider 110 through respective optional delivery systems 160a and 160b, respectively.

The caller telephone 105a is configured to place a call to, or to receive a call from, the call recipient telephone 105b using the telephony infrastructure provider 110. Each of the telephones 105a and 105b may be a landline or wireline phone, a wireless phone, a cellular phone, a mobile personal digital assistant (PDA) with embedded cellular phone technology, or a soft phone, which is a telephone integrated into a computer system. Alternatively or additionally, each of the telephones 105a and 105b may be integrated into a client computer system.

The telephony infrastructure provider 110 provides infrastructure that may be used to operate calls between the telephones 105a and 105b. The telephony infrastructure provider 110 does not determine how the calls between the telephones 105a and 105b should be controlled. Instead, the telephony infrastructure provider 110 relies on the telephony services provider 115 to indicate how the calls should be controlled. In one implementation, communications between the components of the telephony infrastructure provider 110 are packet-based communications that use Internet Protocol (IP).

The telephony services provider 115 determines how the calls between the telephones should be controlled. The telephony services provider 115 instructs the telephony infrastructure provider 110 to control a call between the telephones 105a and 105b in an identified manner. The telephony services provider 115 determines how to control the call based on information that may be accessed only by the telephony services provider 115 and not by the telephony infrastructure provider 110. The telephony services provider may provide Session Initiation Protocol (SIP) signals, H.323 signals, Media Gateway Control Protocol (MGCP) signals, Media Gateway Control (Megaco) signals, Simple Gateway Control Protocol (SGCP) signals, or other types of call handling signals to the telephony infrastructure provider 110 to identify how the call should be handled. In one implementation, the telephony services provider 115 also is an Internet service provider (ISP), and the information that may be accessed only by the telephony services provider may relate to Internet use of customers of the ISP, as well as to other services provided by the ISP. In such implementations, users of the telephones 105a and 105b may be customers of the ISP. As a result, the ISP may provide information relating to Internet use of the users to the telephones 105a and 105b. Furthermore, information describing phone usage and call handling preferences of the users may be presented to the users when the users access the ISP, for example, with a computer.

The data network 120 is configured to enable direct or indirect communications between the voice gateway routers 125a and 125b. The data network 120 may include, for example, one or more of the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The voice gateway routers 125a and 125b route calls between the telephones 105a and 105b. The voice gateway router 125a is associated with the telephone 105a and with a user of the telephone 105a, and the voice gateway router 125b is associated with the telephone 105b and with a user of the telephone 105b. When the voice gateway router 125a receives a call placed from the telephone 105a to the telephone 105b serviced by the voice gateway router 125b, the voice gateway router 125a determines if the call was placed by a user whose calls are controlled by the telephony services provider 115. If so, then the call is routed to the telephony services provider 115 such that the telephony services provider 115 may control the call. If not, then the call is routed to the voice gateway router 125b, which services the telephone 105b, such that the call may be handled normally. The voice gateway router 125b operates in a corresponding manner when a call is placed from the telephone 105b to the telephone 105a. When a call is handled by the telephony services provider 115, the voice gateway routers 125a and 125b receive call handling signals from the telephony services provider 115. The voice gateway routers 125a and 125b execute the received call handling signals to handle the call in a manner identified by the telephony services provider 115. The voice gateway routers 125a and 125b also may be referred to as edge proxy servers or PSTN gateways.

The user databases 130a and 130b enable the voice gateway routers 125a and 125b, respectively, to determine whether received calls should be handled by the telephony services provider 115. More particularly, the user databases 130a and 130b include indications of users of telephones serviced by the voice gateway routers 125a and 125b, respectively, whose calls are controlled by the telephony services provider 115. When a call is received at one of the voice gateway routers 125a and 125b, the voice gateway router may determine that the call should be routed to the telephony services provider 115 when one or more people involved in the call are included in the corresponding user database. The people involved in the call may be identified based on information included in the call, such as the source and destination phone numbers for the call.

The mappings 135a and 135b enable the voice gateway routers 125a and 125b to route calls to telephones serviced by the voice gateway routers 125a and 125b, respectively. More particularly, the mappings 135a and 135b relate phone numbers to IP addresses of telephones that correspond to the phone numbers. Each of the mappings 135a and 135b includes entries for each telephone serviced by the corresponding voice gateway routers 125a and 125b. For example, the voice gateway router 125a may use the mapping 135a to identify an IP address of the telephone 105a when the voice gateway router 125a receives a call to the telephone 105a from, for example, the telephone 105b. In one implementation, the voice gateway router 125b may route the call from the telephone 105b to the voice gateway router 125a based on characteristics of the phone number or the location to which the call is placed. For example, the telephone 105a may be serviced by the voice gateway router 125a as a result of being in a particular location or having a particular phone number. In another implementation, the voice gateway router 125b may route the call to the voice gateway router 125a because the voice gateway router 125a may have informed the voice gateway router 125b that the voice gateway router 125a services the telephone 105a. The voice gateway router 125b may use the mapping 135b to route calls to the telephone 105b in a corresponding manner.

Voice data for a call between the telephones 105a and 105b is sent between the voice gateway routers 125a and 125b through the network over the voice path 140. In addition, signals for controlling the call may be sent over signaling paths 145a and 145b. The signaling paths 145a and 145b are established when the call is to be handled by the telephony services provider 115. Otherwise, a signaling path is established between the voice gateway routers 125a and 125b.

The telephony services signal processing system 150 identifies call handling signals that are used by the voice gateway routers 125a and 125b to control a call between the telephones 105a and 105b. The telephony services signal processing system 150 preferably includes one or more applications that may cause the call to be controlled in a particular manner, by producing call handling signals for the call. One or more of the applications may be selected for execution based on call handling preferences of a user involved in the call.

The call handling preferences, as well as other information needed by the selected applications, may be accessed from the telephony services back-end system 155. In implementations where the telephony services provider 115 also is an ISP, the telephony services back-end system 155 may include information relating to how the user involved in the call uses the ISP. For example, the information may include indications of people with which the user may or may not communicate, events from an electronic calendar of the user, availability of the user, an activity undertaken by the user, times at which calls to the user are blocked or allowed, a maximum allowable amount of time for which the user may participate in telephone calls, and parental controls.

In some implementations, the telephones 105a and 105b are VoIP telephones that may communicate directly with the telephony infrastructure provider 110, for example, using the voice gateway routers 125a and 125b. In such implementations, the delivery systems 160a and 160b are not required. In other implementations, the telephones 105a and 105b are circuit-switched telephones, in which case the delivery systems 160a and 160b are needed to enable the telephones 105a and 105b to communicate with the telephony infrastructure provider 110. The delivery systems 160a and 160b convert circuit-switched data from the telephones 105a and 105b into packets of data that may be used by the telephony infrastructure provider 110. Each of the delivery systems 160a or 160b may be a public switched telephone network (PSTN) or a private branch exchange (PBX) that that may communicate with the telephony services provider 115. Alternatively or additionally, each of the delivery systems 160a and 160b may be an adapter configured to convert data from a circuit-switched telephone into data that may be used by the telephony infrastructure provider 110.

Figure 2:
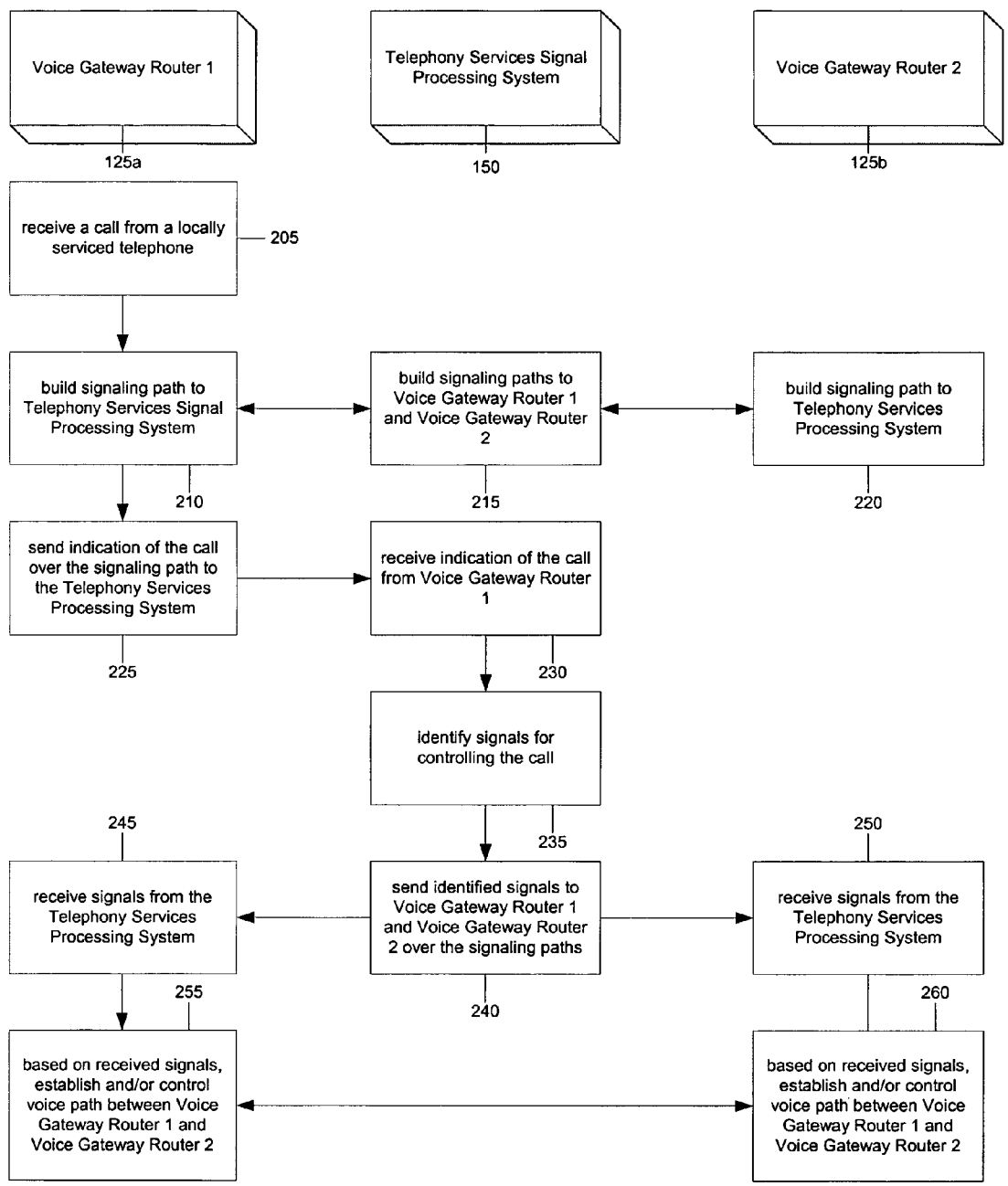
FIG. 2 is a flow chart of a process for controlling a telephone call.

FIG. 2 is a flow chart of a process 200 for handling a call in the enhanced communications system 100. The call is placed from a telephone serviced by a first voice gateway router 125a to a telephone serviced by a second voice gateway router 125b. A signaling path for the call is routed through a telephony services signal processing system 150. The telephony services signal processing system 150 identifies signals for controlling the telephone calls, and the identified signals are sent to the voice gateway routers 125a and 125b to establish or control a voice path between the voice gateway routers 125a and 125b.

The process begins when the voice gateway router 125a receives a call from a locally serviced telephone (205). For example, the voice gateway router 125a may receive the call from the caller telephone 105a of FIG. 1. In implementations where the locally serviced telephone is not a VoIP telephone, the call may be received through a delivery system, such as the delivery system 160a of FIG. 1. The voice gateway router 125a determines whether the call should be routed through the telephony services signal processing system 150. Such a determination may be based on a user database maintained by the voice gateway router 125a, such as the user database 130a of FIG. 1. The user database identifies people whose calls are specially handled by the telephony services signal processing system 150. The voice gateway router 125a may identify people involved in the call based on, for example, phone numbers or IP addresses associated with the call. If the identified people are found in the user database, then the call may be routed through the telephony services signal processing system 150.

When the call is to be routed through the telephony services signal processing system 150 such that the telephony services signal processing system 150 may control the call, the voice gateway router 125a builds a signaling path to the telephony services signal processing system 150 (210). In response, the telephony services signal processing system 150 builds signaling paths to the voice gateway routers 125a and 125b (215), and the voice gateway router builds a signaling path to the telephony services signal processing system 150 (220). As a result, the telephony services signal processing system 150 may send signals for controlling the call to the voice gateway routers over the signaling paths that have been established.

The voice gateway router 125a sends an indication of the call to the telephony services signal processing system 150 over the signaling path to the telephony services signal processing system 150 (225). The indication of the call may include a telephone number or an IP address from which the call was placed, a telephone number or an IP address to which the call was placed, identifiers of people involved in the call, and a time at which the call was placed. The telephony services signal processing system 150 receives the indication of the call from the voice gateway router 125a over the signaling path (230).

The telephony services signal processing system 150 uses the received indication of the call to identify signals for controlling the call (235). The telephony services signal processing system 150 may identify the signals by executing one or more call handling applications included in the telephony services signal processing system 150. The applications may use information that may be accessed from a telephony services back-end system, such as the telephony services back-end system 155 of FIG. 1. The call handling applications that are executed by the telephony services signal processing system 150 may be selected based on call handling preferences for a participant of the call. The chosen applications identify the signals such that the call is controlled in a manner that is consistent with the call handling preferences.

The telephony services signal processing system 150 sends the identified signals to the voice gateway routers 125a and 125b over the signaling paths 145a and 145b that have been established to the voice gateway routers 125a and 125b (240). The voice gateway routers 125a and 125b receive the signals from the telephony services signal processing system 150 (245, 250). In one implementation, the telephony services signal processing system 150 sends only the signals to be used by the voice gateway router 125a to the voice gateway router 125a, and only the signals to be used by the voice gateway router 125b to the voice gateway router 125b.

The voice gateway routers 125a and 125b use the received signals to establish and/or control a voice path 140 between the voice gateway routers 125a and 125b (255, 260). For example, if the received signals indicate that the call should be allowed without restriction, then the voice path is established such that the people involved in the call may communicate over the voice path. In addition, other audio data, such as alerts and ring tones, may be presented to the people involved in the call over the voice path, as may be indicated by the received signals.

As the call is operating, the telephony services signal processing system 150 may continue to identify additional signals for controlling the call, and the identified signals may be sent to the voice gateway routers 125a and 125b. The additional signals may be identified at any time, in response to any stimuli deemed important to the call or the participants of the call. Among these stimuli are dynamic, evolving context of the call, the participants, or external factors that affect or are affected by the session. The additional signals may be identified using any application included in the telephony services signal processing system 150 that applies to the call or to the participants. After the call has been completed, the voice gateway routers 125a and 125b may tear down the voice path and the signaling paths.

In the implementation of the process 200 illustrated in FIG. 2, the voice gateway router 125a sends to the telephony services signal processing system 150 an indication of the call because calls to or from a user that placed the calls are controlled by the telephony services signal processing system 150. In such an implementation, the voice gateway router 125b may not receive an indication of the call until the telephony services signal processing system 150 establishes a signaling path to the voice gateway router. In other implementations of the process 200, the voice gateway router 125b may send the telephony services signal processing system 150 an indication of the call, even though the call was placed from a telephone serviced by the voice gateway router 125a, because calls to or from a user to which the call was placed are controlled by the telephony services signal processing system 150. In such implementations, the voice gateway router 125a may establish a signaling path and may forward an indication of the call to the voice gateway router 125b. Upon a determination that the call is to be controlled, the voice gateway router 125b may tear down the signaling path to the voice gateway router 125a, and may forward an indication of the call to the telephony services signal processing system 150.

Figure 3:
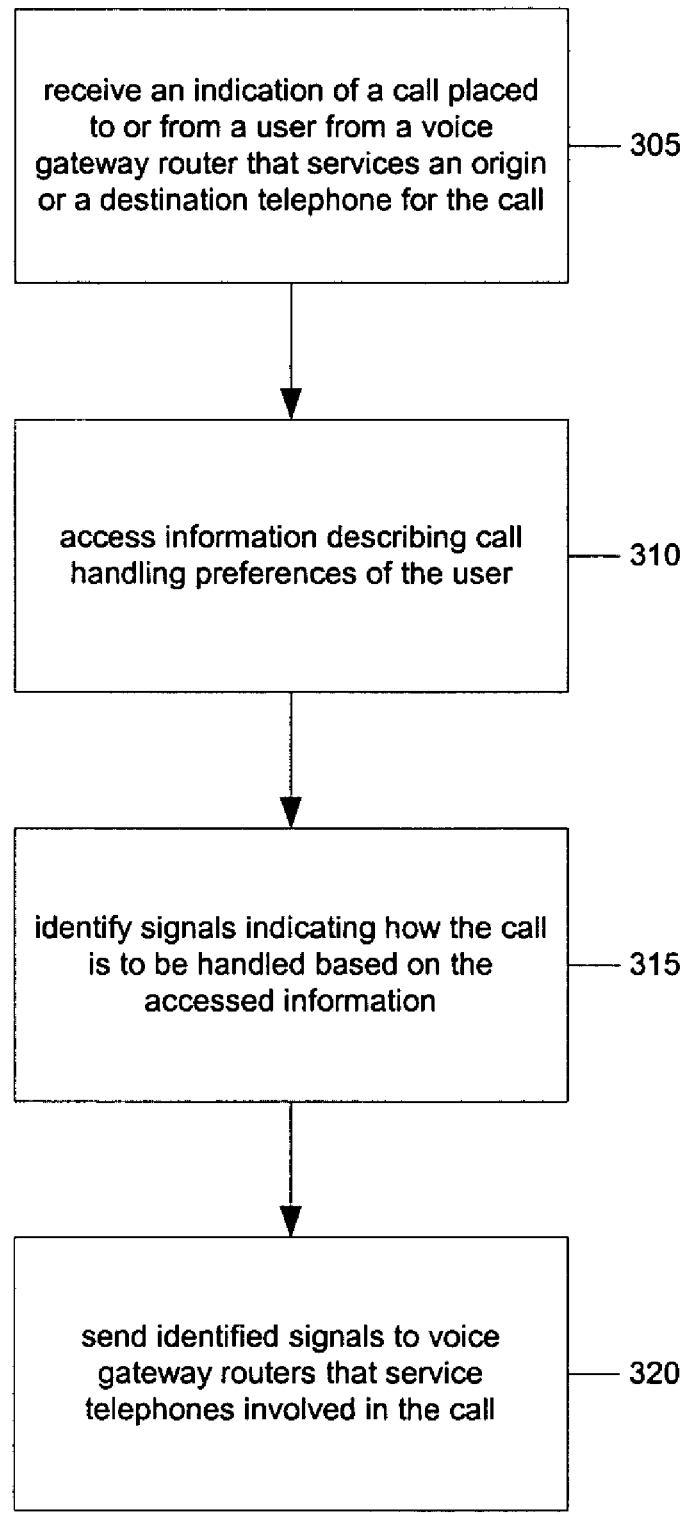
FIG. 3 is a flow chart of a process for identifying control signals for applying services to a telephone call.

Referring to FIG. 3, a process 300 is used to identify signals for controlling a received call. The process 300 may be executed by a telephony services signal processing system of a telephony services provider, such as the telephony services signal processing system 150 of FIG. 1. The telephony services signal processing system is an entity distinct from a telephony infrastructure provider that operates the call in accordance with the identified signals. The telephony services signal processing system identifies the signals using information that may not be accessed by the telephony infrastructure provider.

The process 300 begins when the telephony services provider receives an indication of a call placed to or from a user whose calls are controlled by the telephony services provider (305). The indication of the call is received from a voice gateway router that services an origin or a destination of the call. More particularly, the indication of the call is received from a voice gateway router that services a telephone that is used by a user whose calls are controlled by the telephony services signal processing system 150. The indication of the call may be received over a signaling path that has been established between the voice gateway router and the telephony services signal processing system 150.

The telephony services signal processing system accesses information describing call handling preferences of the user (310). The information may be accessed from a telephony services back-end system, such as the telephony services back-end system 155 of FIG. 1. The call handling preferences for the user may indicate times at which the user desires and does not desire to receive calls. The times at which the user may and may not receive the calls may be indicated by electronic calendar events maintained in an electronic calendar of the user. The call handing preferences also may indicate people with whom the user may or may not desire to communicate. The people may be indicated by contact lists maintained by the user, such as an e-mail address book or an instant messaging buddy list of the user. The call handling preferences may indicate that alerts and reminders of, for example, tasks and calendar events are to be presented to the user while the user is participating in a telephone call.

The telephony services signal processing system identifies signals indicating how the call is to be handled based on the accessed information (315). The signals may be identified through execution of one or more applications included in the telephony services signal processing system. Each of these applications identifies signals for handling the call in a particular manner. The applications that are executed to identify the signals may be selected in a manner indicated by the call handling preferences accessed for the user. For example, if the call handling preferences indicate that the user is to be provided with reminders of events from an electronic calendar maintained by the user while the user is participating in a call, an application for providing the user with the reminders may be executed. The applications may access information from the telephony services back-end system while executing. For example, the application for providing the user with the reminders may access the electronic calendar event for which a reminder is to be provided from the telephony services back-end system.

The identified signals are sent to voice gateway routers that service telephones involved in the call (320). The voice gateway routers execute the signals to control the call in the manner identified by the telephony services signal processing system. Using the example from above, executing the received signals may result in the user being provided with the reminder of the calendar event.

Figure 4:
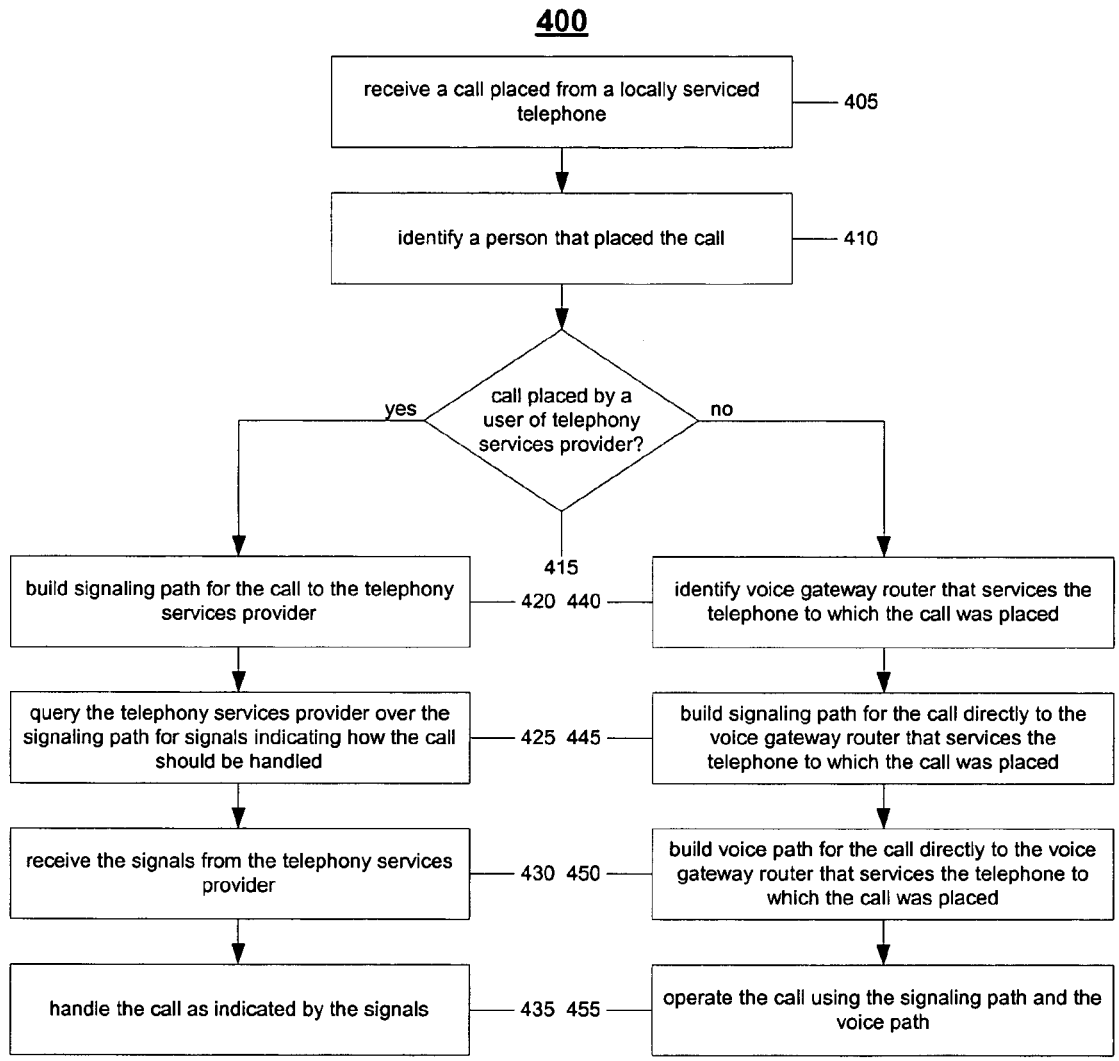
FIG. 4 is a flow chart of a process for retrieving control signals for application to a telephone call.

Referring to FIG. 4, a process 400 is used to retrieve signals for controlling a call. The process 400 may be executed by a voice gateway router of a telephony infrastructure provider, such as one of the voice gateway routers 125*a* and 125*b* of FIG. 1. When a query is to be handled by a telephony services provider, such as the telephony services provider 115 of FIG. 1, the voice gateway router retrieves signals for controlling the call from the telephony services provider. Otherwise, the call is handled normally without retrieving signals from the telephony services provider.

The voice gateway router first receives a call from a locally serviced telephone (405). The call may be received directly from the telephone, or from a delivery system that connects the telephone to the voice gateway router, such as one of the delivery systems 160*a* and 160*b* of FIG. 1. The voice gateway router identifies a person that placed the call (410). The voice gateway router may identify people involved in the call, based on, for example, phone numbers or IP addresses of the locally serviced telephone from which the call was placed.

The voice gateway router determines whether the call was placed by a user of the telephony services provider (415). In other words, the voice gateway router determines whether the person that placed the call is a person whose calls are controlled by the telephony services provider. The voice gateway router may make such a determination by searching for an indication of the person that placed the call in a local user database, such as one of the user databases 130*a* and 130*b* of FIG. 1. If an indication of the person is found in the user database, then the person is a user of the telephony services provider. Otherwise, the person is not a user of the telephony services provider.

If the person is a user of the telephony services provider, then the voice gateway router builds a signaling path to the telephony services provider (420). The voice gateway router may know the location of the telephony services provider and, consequently, may be able to build the signaling path directly to the telephony services provider. The voice gateway router queries the telephony services provider over the signaling path for signals indicating how the call should be handled (425). The voice gateway router may query the telephony services provider for the signals by providing an indication of the call to the telephony services provider over the signaling path.

In response to the query, the telephony services provider identifies the signals, as described above with respect to FIG. 3. The telephony services provider sends the identified signals to the voice gateway router, and the voice gateway router receives the signals (430). The voice gateway router then handles the call as indicated by the received signals (435). More particularly, the voice gateway router executes the received signals such that the call is handled in a manner identified by the telephony services provider.

If the person is not a user of the telephony services provider (415), then the voice gateway router handles the call normally without involving the telephony services provider. More particularly, the voice gateway router identifies a voice gateway router that services the telephone to which the call was placed (440). The voice gateway router may identify the voice gateway router that services the telephone to which the call was placed based on characteristics of the telephone. For example, the voice gateway router first may identify a phone number or a location to which the call was placed from the indication of the call received from the locally serviced telephone. The voice gateway router then may identify the corresponding voice gateway router based on the identified phone number or location.

The voice gateway router then builds a signaling path for the call directly to the voice gateway router that services the telephone to which the call was placed (445), and also builds a voice path for the call directly to the same voice gateway router (450). The voice gateway router, in conjunction with the voice gateway router that services the telephone to which the call was placed, operates the call using the signaling path and the voice path (455). The voice gateway routers may use mappings, such as the mappings 135*a* and 135*b* of FIG. 1, to route signals and voice data to the endpoints of the call. As a result, the call is handled normally without involving the telephony services provider.

The illustrated implementation of the process 400 is executed by a first voice gateway router that services a telephone that placed the call. A similar process may be executed by a second voice gateway router that services a telephone to which the call was placed. In general, the similar process is the same as the illustrated implementation of the process 400. More particularly, the second voice gateway router may receive an indication of the call from the first voice gateway router or from the telephony services provider instead of from the telephone from which the call was placed (405). Instead of identifying a person that placed the call, the second voice gateway router may identify a person to which the call was placed (410).

However, the second voice gateway router may execute the similar process only when the first gateway router does not execute the process 400. If special call handling is to be applied for both the person that placed the call and the person to which the call was placed, control signals for handling the call for the caller are identified first, and control signals for handling the call for the recipient are identified second. The control signals for handling the call for the second user are identified such that those control signals do not conflict with the control signals identified for the caller.

Figure 5:
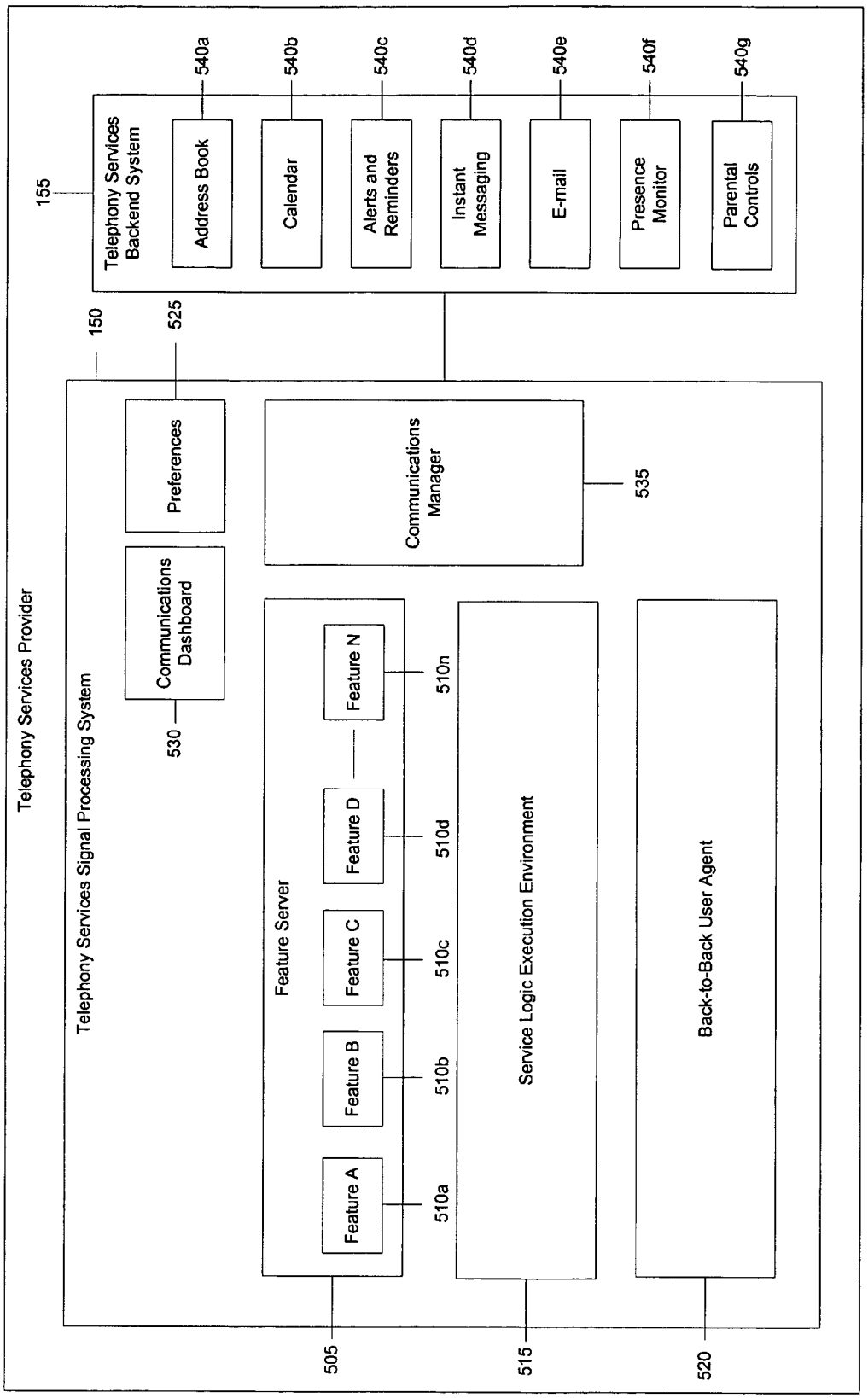
FIG. 5 is a block diagram of a telephony services provider that provides services for controlling telephone calls.

Referring to FIG. 5, one implementation of the telephony services provider 115 of FIG. 1 includes a telephony services signal processing system 150 and a telephony services back-end system 155. The telephony services signal processing system 150 includes a feature server 505 that includes features 510a-510n, a service logic execution environment 515, a back-to-back user agent 520, call handling preferences 525, a communications dashboard 530, and a communications manager 535. The telephony services back-end system includes various information sources 540a-540g that include an address book 540a, a calendar 540b, an alerts and reminders information source 540c, an instant messaging information source 540d, an e-mail information source 540e, a presence monitor 540f, and a parental controls information source 540g.

The feature server 505 manages the features 510a-510n. Each of the features 510a-510n represents an application that may be executed to identify signals for controlling a call in a particular manner. For example, the feature 510a may cause e-mail messages sent to a participant of the call to be read to the participant during the call. The feature 510b may provide to the participant reminders of calendar events from an electronic calendar maintained by the participant, or of tasks to be performed by the participant. The feature 510c may provide news updates, stock quotes, weather reports, or other information to a participant of the call. Such a feature may signal for information to be presented to the user such that other participants in the call may not perceive the information. In addition, the feature 510d may cause ring tones or other call announcements that are specific to participants in a call to be provided to the participants when the calls are received. The feature 510e may allocate charges to a person that placed a call when a recipient of the call indicates that the call is undesirable.

Other features may cause the call to be delivered to an intended recipient of the call. The call may be made to ring busy for a participant that placed the call. Alternatively or additionally, the call may be forwarded to a system that is different than a system to which the call was to be routed originally, such as a voicemail system. A call may be blocked such that an intended recipient of the call does not receive the call. An alert of the call, such as a ring tone, another prerecorded audio message, or a visual alert of the call, may be presented to one or more participants of the call. An identification of a participant that placed the call may be presented to other participants of the call before the call is completed. An incoming call notification may be delivered to an intended recipient when the intended recipient is occupied with an ongoing but different call, and the intended recipient may be enabled to interrupt the ongoing call to handle the incoming call.

The feature server 505 may identify one or more of the features 510a-510n that may be executed to control a call. The feature server 505 provides the identified features to the service logic execution environment 515, which is a generic execution environment in which any of the features 510a-510n may be executed. For example, the service logic execution environment 515 may define an API of supported functions, and the features 510a-510n may be implemented using the API.

The execution of one or more of the features 510a-510n in the service logic execution environment 515 results in the identification of one of more call handling signals that are passed to the back-to-back user agent 520. The back-to-back user agent 520 is an interface of the telephony services provider 115 to a telephony infrastructure provider that operates calls that are controlled by the telephony services provider 115. Signaling paths that are built from the telephony infrastructure provider to the telephony services provider are built to the back-to-back user agent 520. As a result, indications of calls for which control signals are to be identified are received from the telephony infrastructure provider by the back-to-back user agent 520. In addition, the control signals are sent to the telephony infrastructure provider from the back-to-back user agent 520.

The call handing preferences 525 identify one or more of the features 510a-510n to be applied to a call. More particularly, the feature server 505 may use the call handling preferences 525 when identifying which of the features 510a-510n to apply to a call. The call handling preferences 525 may identify conditions that must be satisfied for a particular feature to be applied to the call. The conditions may reference information that may be accessed from the telephony services back-end system 155. The call handling preferences 525 may include conditions for each user whose calls are controlled by the telephony services provider 115. The communications dashboard 530 enables a user whose calls are controlled by the telephony services provider 115, or a supervisor or a guardian of the user, to specify personal call handling preferences. More particularly, the communications dashboard 530 is a user interface that may be accessed by the user to specify the personal call handling preferences. In one implementation, the dashboard 530 may include a program running on a server that can serve web pages to a user accessing the dashboard from a web browser. The communications dashboard 530 also may be used to view information provided by the telephony services back-end system 155.

The communications manager 535 is an interface between the telephony services signal processing system 150 and the telephony services back-end system 155. More particularly, the communications manager 535 may provide an API with which other components of the telephony services signal processing system 150 may request and receive information from the telephony services back-end system 155. In one implementation, the communications manager 535 also may be used by the feature server 505 and the service logic execution environment to access the call handing preferences 525. In one implementation, the communications manager 535 may include a cache of information from information sources 540a-540g such that commonly needed information does not need to be accessed repeatedly from the information sources 540a-540g.

The telephony services back-end system 155 includes information sources 540a-540g that provide information that may be used when identifying one or more of the features 510a-510n for application to a call, or when executing the identified features. The information provided by the information sources 540a-540g may be maintained by the telephony services back-end system 155, or by one or more external systems corresponding to the information sources 540a-540g. For example, information provided by the e-mail information source 540d may be maintained by an e-mail system that is external to the telephony services provider 115.

Each of the information sources 540a-540g may include information that corresponds to each of the users whose calls are controlled by the telephony services provider 115. The information sources 540a-540g are described below with respect to a single user, though each of the information sources 540a-540g typically corresponds to multiple users.

The address book 540a includes contact information of people known to the user. The address book 540a may be used to determine if a person or opposite party participating in a call for which control signals are being identified is known to the user. In particular, if contact information for the person is found in the address book, then the person may be assumed to be known by the user. A feature may be applied to the call depending on whether the person is known to the user. For example, a feature for providing contact information for the user may be applied to the call only when the user communicates with a known person in the call. Furthermore, execution of a feature may require a determination of whether another person participating in a call is known to the user. For example, a feature for providing an alert to the user may require a determination of whether the other participant is known such that the alert may be presented only to the user when the participant is not known, and to both the user and the other participant when the participant is known.

The calendar 540*b* includes indications of events in which the user is to participate. A feature may be applied to a call when the user is participating in a particular type of event from the calendar 540*b*. For example, a feature for providing news alerts to the user over a telephone used by the user may be applied to the call because the user is participating in the call as part of an event indicated by the calendar 540*b*. In addition, execution of a feature may require accessing a description of an event in which the user is participating such that signals for presenting the description to the user may be identified. For example, a feature for providing alerts of events to the user may access a description of the event such that the description may be provided to the user. The events indicated by the calendar 540*b* may indicate the availability of the user, for example, to place and receive calls. For example, the user may be unavailable when participating in one of the events, and may be available otherwise. The alerts and reminders information source 540*c* may include similar indications of events and tasks in which the user is to participate.

The instant messaging information source 540*d* and the e-mail information source 540*e* both include information describing instant messages and e-mail messages sent and received by the user. Signals for presenting instant messages and e-mail messages to the user may be identified by one of the features 510*a*-510*n*, but the call handling preferences 525 may indicate that such a feature is only to be executed when the information sources 540*d* and 540*e* include messages that have not been presented to the user already. For example, if a new e-mail message or a new instant message for the user is received while the user is participating in the call, then an indication of the new message, such as a sender, subject, or a time of receipt of the message, may be presented to the user. In response to the indication, the user may signal for the message to be read. Appropriate signals for reading the message to the user such the message is not read to other participants of the call do not hear the message may be identified.

The presence monitor 504*f* indicates a current activity of the user. For example, the presence monitor 540*f* may indicate whether the user is communicating with one or more other entities using a telephone, instant messages, or e-mail messages, or participating in an event from an electronic calendar of the user. The call handling preferences 525 may indicate that one or more of the features 510*a*-510*n* be selected for execution if the user is using the telephone. For example, if the presence monitor 504*f* indicates that the user is communicating using a telephone and instant messages, a feature for presenting new instant messages to the user on the telephone may be selected for execution.

In addition, the signals identified through execution of one of the features 510*a*-510*n* may depend on an activity of the user. For example, a feature for determining whether the user may or may not participate in a call based on an activity of the user may identify signals for blocking or allowing the call, depending on the activity of the user. For example, the user may be available to participate in the call when participating in particular activities, and signals for allowing the user to participate in the call may be identified when the presence monitor 504*f* indicates that the user is participating in one of the particular activities. Furthermore, the user may not be available to participate in the call when participating in other activities, and signals for blocking the call may be identified when the presence monitor 504*f* indicates that the user is participating in one of the other activities. In other words, the current activity identified by the presence monitor 504*f* may indicate the availability of user to place and receive telephone calls.

The parental controls information source 540*g* includes information describing parental controls the telephone use of the user. For example, the parental controls information source 540*g* may include an indication of an amount of time during a period for which the user has communicated using a telephone, as well as an indication of a maximum amount of time during the period for which the user may communicate using the telephone. The parental controls information source 540*g* also may include indications of times when the user may participate in telephone calls, and times when the user may not participate in telephone calls. The parental controls information source 540*g* also may include indications of people to or from whom calls are blocked.

The call handling preferences 525 may indicate that one or more of the features 510*a*-510*n* be selected for application to a call based in information included in the parental controls information source 540*g*. For example, if the parental controls information source 540*g* indicates that the present time is a time at which the user may not participate in the call, then the a feature for notifying other participants in the call that the user may not participate in the call may be selected for execution. As another example, if the parental controls information source 540*g* indicates that one or more other participants in the call are people to or from whom calls are blocked, then a feature for blocking the call may be selected for execution.

In addition, the signals identified through execution of one of the features 510*a*-510*n* may depend on the information included in the parental controls information source 540*g*. For example, a feature for blocking or allowing a call may identify signals for allowing the call when the user has not communicated for longer than the maximum allowable amount of time during the time period. In addition, the feature may identify signals for blocking the call when the user has communicated for at least the maximum allowable amount of time during the time period. Furthermore, the feature may identify signals for allowing the call when the other participants in the call are people whose calls are allowed, and signals for blocking the call when the one or more of the other participants in the call are people whose calls are blocked.

Information included in the telephony services back-end system 155 may be updated as a result of the execution of one or more of the features 510*a*-510*n*. For example, when a feature for allowing the user to participate in a call is executed, information included in the presence monitor 504*f* may be updated to indicate that the user currently is participating in the call. In general, the information may be updated to include an indication of availability of the first call participant to place and receive a call, an activity undertaken by the first call participant, a time at which the first call participant may or may not place or receive a call, a person with which the first call participant may or may not participate in a call, an amount of time for which the first call participant has participated in calls, a call handling preference, or a parental control.

The updated information may be used to identify control signals for future calls. For example, if a subsequent call for the user is received while the user still is participating in the original call, control signals for providing a notification of the subsequent call to the user in a manner that does not interfere with the user's participation in the original call may be identified. Such control signals may be identified based on the updated information included in the presence monitor 504*f*, which indicates that the user is participating in the original call.

The information included in the telephony services back-end system 155 and the preferences 525 that applies to the user may be specified by the user, or by a guardian or supervisor of the user, such as a parent or an employer of the user. For example, the user or the guardian or supervisor of the user may be presented a graphical user interface that may be used to specify the information. The user, or the guardian or supervisor of the user, may specify the information by accessing the telephony services back-end system 155 directly, or by accessing one or more of the external systems that correspond to the information sources 540*a*-540*g*. For example, the user may specify the information included in the address book 540*a* with an external communications system, such as an e-mail system. The information is specified prior to being used to identify control signals for a call.

Figure 6:
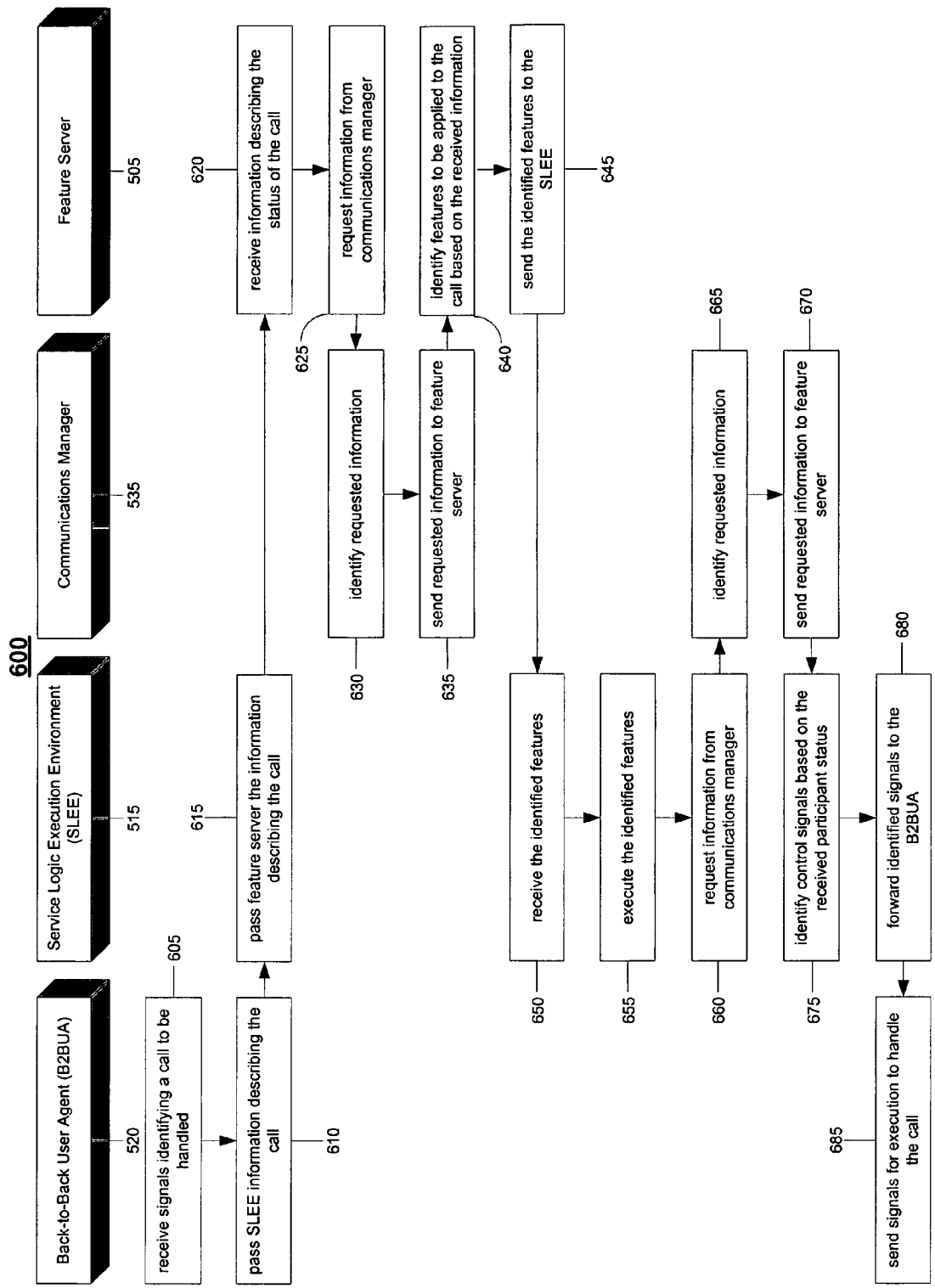
FIG. 6 is a flow chart of a process for identifying control signals for a telephone call using the telephony services provider of FIG. 5.

Referring to FIG. 6, a process 600 is executed by the telephony services provider 115 of FIG. 5 to identify control signals for handling a call that involves a user of the telephony services provider 115. The process 600 includes multiple components of the telephony services provider 115, such as the back-to-back user agent (B2BUA) 520, the service logic execution environment (SLEE) 515, the communications manager 535, and the feature server 505.

The process begins when the B2BUA 520 receives signals identifying a call to be handled (605). The signals are received over a signaling path that has been established to the B2BUA 520 by a telephony infrastructure provider that is operating the call. The telephony infrastructure provider may send the signals identifying the call to the B2BUA 520 because the telephony infrastructure provider determined that the call should be handled by the telephony services provider 115. The B2BUA 520 passes information describing the call to the SLEE 515 (610). The SLEE 515 passes the information to the feature server 505 (615), and the feature server 505 receives the information (620). The information may include telephone numbers to and from which the call was placed, identifiers of people participating in the call, and a time at which the call was placed.

The feature server 505 requests information from the communications manager 535 (625). More particularly, the feature server 505 requests information that may be used when identifying which of one or more included features, such as the features 510*a*-510*n* of FIG. 5, should be applied to the call. The requested information may include call handling preferences for one or more of the participants in the call.

The communications manager 535 identifies the requested information (630), for example from the telephony services back-end system 155, and then sends the requested information to the feature server 505 (635). Using the received information, the feature server 505 identifies one or more of the included features to be applied to the call (640). For example, the call handling preferences may indicate that a particular feature should be applied for one of the participants in the call, so the feature server 505 may identify the particular feature as one of the features to be applied to the call.

The feature server 505 sends the identified features to the SLEE 515 for execution (645), and the SLEE 515 receives the features (650). The SLEE 515 executes the received features to identify control signals for handling the call (655). Execution of one or more of the features may require information from the telephony services back-end system 155, and the SLEE 515 requests that information from the communications manager 535 (660). The communications manager 535 identifies the requested information from the telephony services back-end system 155 (665) and sends the requested information to the SLEE 515 (670).

The SLEE 515 continues to execute the features that were sent by the feature server 505 using the information received from the communications manager, and identifies control signals for handling the call (675). The SLEE 515 forwards the identified signals to the B2BUA 520 (680). The B2BUA 520 may validate the signals received from the SLEE 515 to verify that the signals will result in allowable handling of the call. The B2BUA 520 sends the signals for execution to handle the call (685). More particularly, the B2BUA 520 sends the signals over the signaling path on which the signals identifying the call were received. The telephony infrastructure provider receives and executes the signals to handle the call as indicated by the features that were executed.

Figure 7:
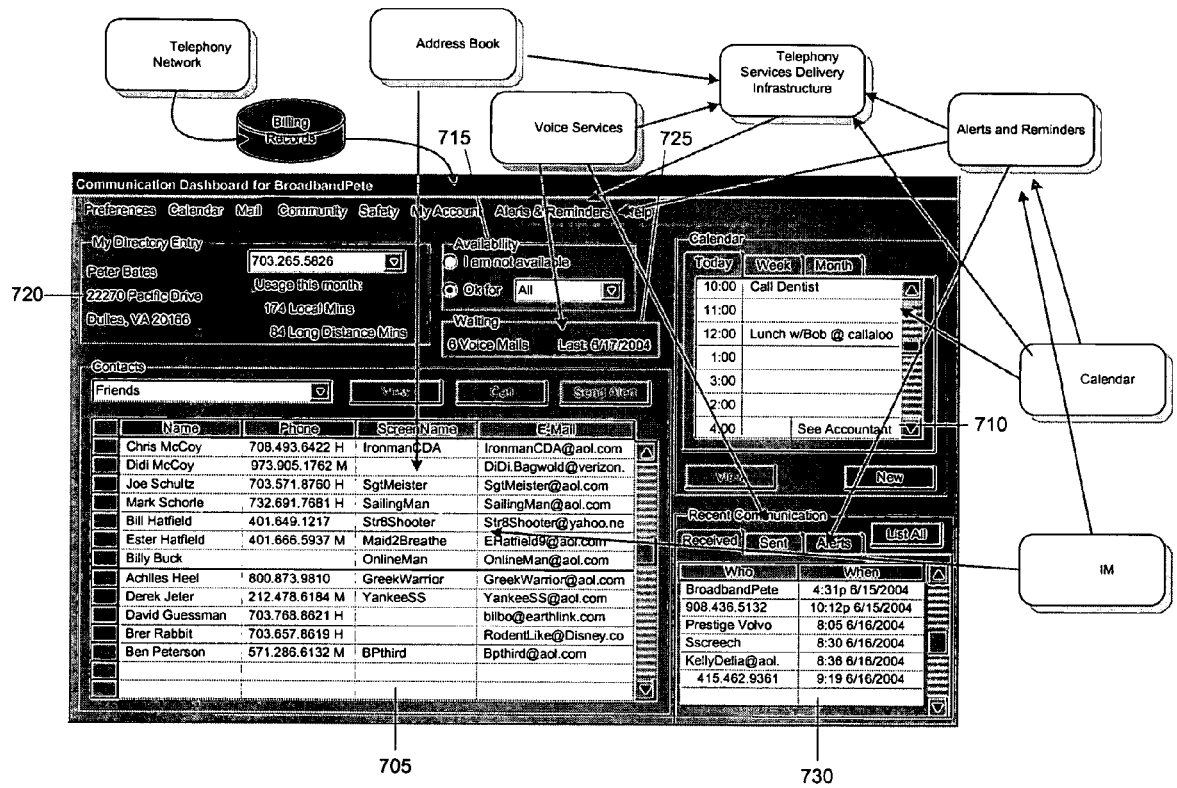
FIG. 7 is an illustration of an interface for presenting information related to call handling services.

Referring to FIG. 7, one implementation of the communications dashboard 530 of FIG. 5 enables a user to view information used when identifying signals for controlling telephone calls involving the user. The communications dashboard 530 includes multiple sections 705-730, including a contact list 705, a calendar 710, an availability indicator 715, a contact information indicator 720, a voice mail indicator 725, and a recent communications indicator 730. Interaction with the communications dashboard 530 may add or modify information to the call handling preferences 525 and the telephony services back-end system 155 of FIG. 5.

The contact list 705 includes contact information for people known to a user for which the communications dashboard 535 is presented. The information included in the contact list 705 may be taken from one or more external sources, such as an address book of an e-mail system or a buddy list of an instant messaging system. In one implementation, one of the entries of the contact list 705 may be selected and an additional interface may be presented for specifying call handling preferences for calls to or from a person corresponding to the entry. For example, the additional interface may enable the specification of a ring tone for calls from the person.

The calendar 710 includes events from an electronic calendar of the user that may be retrieved from an external system that maintains the electronic calendar. Similarly to the contact list 705, one of the events may be selected to display an additional interface for specifying call handling preferences related to the event. For example, the additional interface may enable the specification of whether an alert for the selected event will be presented to the user, and, if so, the type of alert to be presented to the user.

The availability indicator 715 indicates the availability of the user to participate in telephone calls. The user may specify an availability with the availability indicator 715 to override other automatic determinations of the availability of the user that may be made. The specified availability may indicate one or more call handling applications or features to be applied to calls to the user, such as the features 510*a*-510*n* of FIG. 1. The specified availability also may affect the control signals that are identified with the one or more call handling applications.

The contact information indicator 720 includes contact information for the user. The voice mail indicator 725 indicates whether or not new voicemails for the user have been received. In one implementation, the information presented by the contact information indicator 720 and the voicemail indicator 725 does not affect how calls to the user are handled. In other implementations, the information presented by the indicators 720 and 725 may be used to identify and to affect the execution of the one or more call handling applications. For example, a call handling application may be identified for execution only when a new voicemail has been received for the user.

The recent communications list 730 identifies recent communications of the user. The recent communications may include telephone calls, instant messages, and e-mail messages. The recent communications list 730 may include indications of how the recent communications were handled. Such indications may be used to identify how future communications are to be handled. For example, future communications may be handled in the same manner as the recent communications, such that the applications for handling the future communications may be identified based on the indications of how the recent communications were handled.

Control signals for handling a call are described throughout as first being identified and then being distributed for execution. However, control signals may be identified throughout the entire duration of the call, and the control signals may be distributed as they are identified. As a result, the call may be continually and asynchronously controlled through the entire call, rather than being controlled at one or more points within the call. When control signals are identified at multiple points during a call, different features or applications may be used at each of the multiple points to identify the signals.

A voice gateway router is described throughout as a single entity to which signaling and voice paths are established such that calls to telephones serviced by the voice gateway router may be controlled. In particular implementations of the described techniques, the voice gateway router may include multiple subsystems that collectively operate as the voice gateway router described herein. For example, the voice gateway router may include one or more subsystems that are analogous to a telephony services signaling processing 150 of FIG. 1 such that control signals may be identified for calls that are not handled by an external telephony services provider, such as the telephony services provider 115 of FIG. 1. However, such subsystems may not access the information included in the telephony services provider, such as the information included in the telephony services back-end system 155 of FIG. 1.

A VoIP telephony system is described throughout as a telephone system in which calls are operated by a telephony infrastructure provider and are controlled by a telephony services provider. However, other telephone systems may be used to enable a telephony services provider to control calls operated by a telephony infrastructure provider. For example, the telephony services provider may be applied to a circuit-switched implementation of the described techniques such that calls between telephones connected to a circuit switched telephone network provided by a telephony infrastructure provider may be controlled by an external telephony services provider.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for applying services to calls placed to or from subscribers to a telephony services provider, the method comprising:

receiving, at a first telephony proxy server controlled by a telephony infrastructure provider, a request to place a call to or from a first call participant;

identifying a second telephony proxy server also controlled by the telephony infrastructure provider but associated with a second call participant;

in response to the request, determining whether the first call participant is a subscriber to telephony services provided by the telephony services provider;

if the first call participant is determined to not be a subscriber to telephony services provided by the telephony services provider, establishing a direct signaling path and a direct voice path for the call directly between the first telephony proxy server and the second telephony proxy server bypassing the telephony services provider; and if the first call participant is determined to be a subscriber to telephony services provided by the telephony services provider:

(i) establishing a first signaling path for the call between the first telephony proxy server and the telephony services provider, (ii) establishing a second signaling path for the call between the second telephony proxy server and the telephony services provider, (iii) sending an indication of the call to the telephony services provider over the first signaling path, (iv) receiving the indication of the call at the telephony services provider over the first signaling path, (v) identifying, at the telephony services provider, one or more control signals configured to affect a voice path of the call that is established between the first telephony proxy server and the second telephony proxy server, and (vi) sending the identified control signals to the first telephony proxy server over the first signaling path and to the second telephony proxy server over the second signaling path.

2. The method of claim 1 wherein identifying the control signals comprises:
accessing an indication of whether the first call participant may participate in the call based upon information stored on a back-end system controlled by the telephony services provider related to the first call participant to or from whom the call is placed;
determining whether the first call participant is available to participate in the call based upon the accessed indication; and
identifying the control signals based upon the determination of whether the first call participant may participate in the call.

3. The method of claim 1 wherein identifying the control signals comprises:
accessing information to be presented to the first call participant during the call based upon information stored on a back-end system controlled by the telephony services provider related to the first call participant to or from whom the call is placed; and
identifying control signals configured to present the accessed information to the first call participant.

4. The method of claim 1 wherein identifying the control signals comprises:
accessing an indication of availability of the first call participant to place and receive calls based upon information stored on a back-end system controlled by the telephony services provider related to the first call participant to or from whom the call is placed; and
identifying the control signals based upon the accessed indication of availability.

5. The method of claim 1 wherein identifying the control signals comprises:
accessing an indication of an activity undertaken by the first call participant at a time at which the indication of the call is received by the telephony services provider based upon information stored on a back-end system controlled by the telephony services provider related to the first call participant to or from whom the call is placed; and
identifying the control signals based upon the accessed indication of the activity.

6. The method of claim 5 wherein identifying the control signals comprises:
determining whether the activity is an activity during which the first call participant may or may not participate in the call; and
identifying the control signals based upon the determination of whether the first call participant may or may not participate in the call.

7. The method of claim 5 wherein accessing an indication of an activity comprises accessing an indication of at least one activity from among a list of activities including participation in an event from an electronic calendar of the first call participant, participation in another call, communication with another entity, sending and receiving instant messages, and sending and receiving e-mail messages.

8. The method of claim 1 wherein identifying the control signals comprises:
accessing at least one indication of a time at which a call to the first call participant is to be blocked or allowed based upon information stored on a back-end system controlled by the telephony services provider related to the first call participant to or from whom the call is placed;
comparing a present time to the time at which a call to the first call participant is to be blocked or allowed; and
identifying the control signals based upon the comparison.

9. The method of claim 1 wherein identifying the control signals comprises:
accessing an indication of an amount of time for which the first call participant has participated in phone calls and a maximum allowable amount of time for which the first call participant may participate in telephone calls based upon information stored on a back-end system controlled by the telephony services provider related to the first call participant to or from whom the call is placed;
comparing the amount of time for which the first call participant has participated in phone calls to the maximum allowable amount of time; and
identifying the control signals based upon the comparison.

10. The method of claim 1 wherein identifying the control signals comprises:
accessing an indication of a parental control that has been specified for the first call participant based upon information stored on a back-end system controlled by the telephony services provider related to the first call participant to or from whom the call is placed; and
identifying the control signals based upon the accessed indication of the parental control.

11. The method of claim 1 wherein identifying the control signals comprises:
accessing at least one indication of a person to or from whom calls are allowed or blocked based upon information stored on a back-end system controlled by the telephony services provider related to the first call participant to or from whom the call is placed;
comparing the second call participant to the person to or from whom calls are allowed or blocked; and
identifying the control signals based upon the determination of whether the first call participant may participate in the call.

12. The method of claim 1 wherein identifying the control signals comprises:
enabling the first call participant or a guardian or supervisor of the first call participant to specify information stored on a back-end system controlled by the telephony services provider related to the first call participant to or from whom the call is placed that is accessed for use in identifying the control signals; and
identifying the control signals based upon the specified information.

13. The method of claim 12 wherein enabling the first call participant or a guardian or supervisor of the first call participant to specify the information comprises presenting to the first call participant or to guardian or supervisor of the first call participant a graphical user interface with which the first call participant or the guardian or supervisor of the first call participant may specify the information.

14. The method of claim 13 wherein identifying the control signals comprises:
accessing at least one call handling preference that has been specified by the first call participant prior to a time at which the indication of the call is received by the telephony services provider based upon information stored on a back-end system controlled by the telephony services provider related to the first call participant to or from whom the call is placed; and identifying the control signals based upon the accessed call handling preference.

15. The method of claim 13 wherein identifying the control signals comprises:

accessing at least one call handling preference that has been specified by a supervisor or a guardian of the first call participant prior to a time at which the indication of the call is received by the telephony services provider based upon information stored on a back-end system controlled by the telephony services provider related to the first call participant to or from whom the call is placed; and identifying the control signals based upon the accessed call handling preference.

16. The method of claim 1 wherein identifying the control signals comprises:

updating information stored on a back-end system controlled by the telephony services provider that is accessed when identifying the control signals based upon the identified control signals, the updated information indicating a status of the first call participant as a result of processing of the identified control signals; and identifying control signals for future calls based upon the updated information.

17. The method of claim 16 wherein updating the information based upon the identified control signals comprises updating the information to include at least one indication from a list of indications including an indication of availability of the first call participant to place and receive a call, an indication of an activity undertaken by the first call participant, an indication of a time at which the first call participant may or may not place or receive a call, an indication of a person with which the first call participant may or may not participate in a call, an indication of an amount of time for which the first call participant has participated in calls, an indication of a call handling preference, or an indication of a parental control.

18. The method of claim 1 wherein identifying the control signals comprises identifying control signals to cause identification of the first or second call participant who placed the call to be presented to a call recipient before the voice path is established therebetween.

19. The method of claim 1 wherein identifying the control signals comprises identifying control signals to cause an incoming call notification to be delivered to an intended recipient when the intended recipient is occupied with an ongoing but different call and to enable the intended recipient to interrupt the ongoing but different call to handle the incoming call.

20. The method of claim 19 wherein identifying control signals to cause an incoming call notification to be delivered to an intended recipient comprises identifying control signals to cause the incoming call notification that identifies the first or second call participant who placed the call to the intended recipient to be delivered to the intended recipient.

21. The method of claim 1 wherein the identifying the control signals comprises identifying control signals to cause the call to be delivered to an intended recipient.

22. The method of claim 1 wherein identifying the control signals comprises identifying control signals to cause the call to ring busy for the first or second call participant who placed the call.

23. The method of claim 1 wherein identifying the control signals comprises identifying control signals to cause the call to be forwarded to a system different than a system to which the call was to be routed originally.

24. The method of claim 23 wherein the different system is a voicemail system such that identifying the control signals comprises identifying control signals to cause the call to be forwarded to a voicemail system.

25. The method of claim 1 wherein identifying the control signals comprises identifying control signals to cause the call to be blocked such that an intended recipient of the call does not receive the call.

26. The method of claim 1 wherein identifying the control signals comprises identifying control signals to cause an alert of the call to be presented to the first call participant.

27. The method of claim 1 wherein identifying the control signals comprises identifying control signals to cause a prerecorded message to be played to the first or second call participant who placed the call or an intended call recipient.

28. The method of claim 1 wherein the voice path is established between the first telephony proxy server and a second telephony proxy server based on the control signals.

29. The method of claim 1 wherein the identified signals conform to the Session Initiation Protocol (SIP).

30. A machine-accessible medium that when accessed, results in a machine performing operations for applying services to calls placed to or from subscribers to a telephony services provider, comprising:

receiving, at a first telephony proxy server controlled by a telephony infrastructure provider, a request to place a call to or from a first call participant;

identifying a second telephony proxy server also controlled by the telephony infrastructure provider but associated with a second call participant;

in response to the request, determining whether the first call participant is a subscriber to telephony services provided by the telephony services provider;

if the first call participant is determined to not be a subscriber to telephony services provided by the telephony services provider, establishing a direct signaling path and a direct voice path for the call directly between the first telephony proxy server and the second telephony proxy server bypassing the telephony services provider; and if the first call participant is determined to be a subscriber to telephony services provided by the telephony services provider:

(i) establishing a first signaling path for the call between the first telephony proxy server and the telephony services provider, (ii) establishing a second signaling path for the call between the second telephony proxy server and the telephony services provider, (iii) sending an indication of the call to the telephony services provider over the first signaling path, (iv) receiving the indication of the call at the telephony services provider over the first signaling path, (v) identifying, at the telephony services provider, one or more control signals configured to affect a voice path of the call that is established between the first telephony proxy server and the second telephony proxy server, and (vi) sending the identified control signals to the first telephony proxy server over the first signaling path and to the second telephony proxy server over the second signaling path.

31. A system for applying services to calls placed to or from subscribers to a telephony services provider, the system comprising:

means for receiving, at a first telephony proxy server controlled by a telephony infrastructure provider, a request to place a call to or from a first call participant;

means for identifying a second telephony proxy server also controlled by the telephony infrastructure provider but associated with a second call participant;

means for, in response to the request, determining whether the first call participant is a subscriber to telephony services provided by the telephony services provider;

means for, if the first call participant is determined to not be a subscriber to telephony services provided by the telephony services provider, establishing a direct signaling path and a direct voice path for the call directly between the first telephony proxy server and the second telephony proxy server bypassing the telephony services provider; and means for, if the first call participant is determined to be a subscriber to telephony services provided by the telephony services provider:
(i) establishing a first signaling path for the call between the first telephony proxy server and the telephony services provider,
(ii) establishing a second signaling path for the call between the second telephony proxy server and the telephony services provider,
(iii) sending an indication of the call to the telephony services provider over the first signaling path,
(iv) receiving the indication of the call at the telephony services provider over the first signaling path,
(v) identifying, at the telephony services provider, one or more control signals configured to affect a voice path of the call that is established between the first telephony proxy server and the second telephony proxy server, and
(vi) sending the identified control signals to the first telephony proxy server over the first signaling path and to the second telephony proxy server over the second signaling path.

32. The method of claim 1, wherein the direct signaling path, the first signaling path, and the second signaling path are paths over which Session Initiation Protocol (SIP) call handling signals are communicated to affect the voice path of the call.

33. The method of claim 1, wherein the direct signaling path, the first signaling path, and the second signaling path are paths over which H.323 call handling signals, Media Gateway Control Protocol (MGCP) call handling signals, Media Gateway Control (Megaco) call handling signals, or Simple Gateway Control Protocol (SGCP) call handling signals are communicated to affect the voice path of the call.

34. The method of claim 1, wherein determining whether the first call participant is a subscriber comprises:
determining an identity of the first call participant based on a phone number or an IP address of a locally serviced telephone from which the call was placed, and
determining whether the first call participant is a user of the telephony services provider by searching for an indication of the identity of the first call participant in a user database.

35. The method of claim 1, further comprising if the first call participant is determined to be a subscriber to telephony services provided by the telephony services provider, no direct signaling path is established directly between the first telephony proxy server and the second telephony proxy server that bypasses the telephony services provider.

36. The method of claim 1, wherein identifying, at the telephony services provider, one or more control signals configured to affect a voice path of the call comprises identifying, at the telephony services provider, one or more control signals configured to affect a voice path of the call that is established directly between the first telephony proxy server and the second telephony proxy server.

37. A method for applying services to calls placed to or from subscribers to a telephony services provider, the method comprising:
receiving, at a first telephony proxy server controlled by a telephony infrastructure provider, a request to place a call to or from a first call participant;
identifying a second telephony proxy server also controlled by the telephony infrastructure provider but associated with a second call participant;
in response to the request, determining whether the first call participant is a subscriber to telephony services provided by the telephony services provider;
if the first call participant is determined to not be a subscriber to telephony services provided by the telephony services provider, establishing a direct signaling path and a direct voice path for the call directly between the first telephony proxy server and the second telephony proxy server bypassing the telephony services provider; and
if the first call participant is determined to be a subscriber to telephony services provided by the telephony services provider:
(i) establishing a first signaling path for the call between the first telephony proxy server and the telephony services provider,
(ii) establishing a second signaling path for the call between the second telephony proxy server and the telephony services provider,
(iii) sending an indication of the call to the telephony services provider over the first signaling path,
(iv) receiving, at the first telephony proxy server and over the first signaling path, one or more first control signals from the telephony services provider configured to affect a voice path of the call that is established between the first telephony proxy server and the second telephony proxy server, and
(v) receiving, at the second telephony proxy server and over the second signaling path, one or more second control signals from the telephony services provider configured to affect the voice path of the call that is established between the first telephony proxy server and the second telephony proxy server.

38. A method for applying services to calls placed to or from subscribers to a telephony services provider, the method comprising:
receiving an indication of a call placed to or from a first call participant, the indication being received by a telephony services provider over a first signaling path of the call that is conditionally established between the telephony services provider and a first telephony proxy server that is controlled by a telephony infrastructure provider;
identifying, at the telephony services provider, one or more control signals configured to affect a voice path of the call that is established between the first telephony proxy server and a second telephony proxy server and
sending the identified control signals to the first telephony proxy server over the first signaling path and to the second telephony proxy server over a second signaling path that is conditionally established between the telephony services provider and the second telephony proxy server, wherein the first signaling path and the second signaling path being conditionally established comprises:

the first signaling path and the second signaling path not being established by the telephony infrastructure provider if the first call participant is determined to not be a subscriber to telephony services provided by the telephony services provider and instead a direct signaling path being established by the telephony infrastructure provider between the first telephony proxy server and the second telephony proxy server bypassing the telephony services provider, and the first signaling path and the second signaling path being established by the telephony infrastructure provider if the first call participant is determined to be a subscriber to telephony services provided by the telephony services provider.

* * * * *